UNITED STATES PATENT OFFICE.

WALTHER NERNST, OF GÖTTINGEN, GERMANY, ASSIGNOR TO GEORGE WESTINGHOUSE, OF PITTSBURG, PENNSYLVANIA.

GLOWER FOR ELECTRIC LAMPS.

SPECIFICATION forming part of Letters Patent No. 685,729, dated October 29, 1901.

Application filed August 24, 1899. Serial No. 728,354. (No specimens.)

*To all whom it may concern:*

Be it known that I, WALTHER NERNST, a subject of the Emperor of Germany, residing in Göttingen, Germany, have invented certain new and useful Improvements in Glowers for Electric Lamps, of which the following is a specification.

The chief requirements for glowers formed from materials which are non-conductors when cold, but which become conductors when heated, are that they shall operate for a considerable period with but little change in the voltage required to cause a given current to pass through them, that they shall vary as little as possible in the amount of light which they emit during their period of operation, and that they shall have mechanical strength sufficient to withstand ordinary use. I have experimented with a very great number of those substances which increase in conductivity as they become heated, and I have subjected them to a great variety of tests and have used them for actual lighting purposes during many hours of service. I have constructed certain glowers by taking oxid of zirconium, about eighty parts, and mixing it with about twenty parts of all the rare earths which are found in gadolinite. In general gadolinite may be described as a black vitreous subtranslucent silicate having the approximate formula $Fe, Y_2, Be_2Si_2, O_{10}$, and it is closely analogous to several other minerals, notably euxinite, allanite, and orthite. It is known that this mineral contains a number of the rare earths, and I have sometimes treated this mineral and separated out from it the individual rare earths to be used as elements of electric-lamp glowers or for other purposes; but I find that if I combine about twenty parts of the composite mixture of rare earths which are found in gadolinite with about eighty parts of the oxid of zirconium I am able to produce a glower which has most or all of the qualities desired.

My present invention relates to the improvement in glowers which consists in using as the material for such glowers about eighty parts of the oxid of zirconium and about twenty parts of a mixture of all the rare earths found in gadolinite. I find it of advantage in some cases to separate the rare earths of gadolinite into two divisions, the one containing the earths of the cerium group, the other those of the yttrium group, and to use in making glowers only those of the yttrium group which I term the "yttrium earths." The cerium group comprises cerium, didymium, samarium, and some others of hypothetical existence, while the yttrium group is generally considered to include yttrium, erbium, terbium, ytterbium, scandium, and such metals as thulium, holmium, dysprosium, gadolinium, and decipium are by some chemists ascribed to that group. While the metals of the cerium group are not necessarily injurious, their presence would usually seem to be unnecessary and sometimes troublesome, owing to their being, as a rule, volatile at somewhat lower temperatures than the oxids of the metals of the yttrium group.

The manner in which I make a glower having the constituent elements above set forth is to take about eighty parts of the oxid of zirconium and about twenty parts of the rare earths of gadolinite or of the yttrium group therein, both in a powdered state, and form from them a paste by adding water and some binding material, such as tragacanth, dextrine, or the like. The powdered oxids are first fully mixed together, and the binding material is also finely powdered and thoroughly mixed with the oxids. Sufficient water is added to form a paste, and the glowers are then shaped by any preferred process. In case the glowers are to be tubular in form the pasty material is passed through a press and shaped by that means. The rods or strips of material thus shaped are dried and baked thoroughly in any suitable manner, and conducting terminals are secured to the ends of the glowers in any convenient way.

In another application originally filed by me on the 24th day of August, 1899, and renewed April 13, 1900, Serial No. 12,689, claims are made to mixtures of preponderating amounts of zirconia, together with the oxids of erbium and yttrium.

I claim as my invention—

1. A glower for electric lamps, composed, approximately of eighty parts of the oxid of zirconium, and twenty parts of a mixture of the rare earths of gadolinite.

2. A glower for electric lamps, composed approximately of eighty parts of the oxid of zirconium, and twenty parts of a mixture of the rare earths of the yttrium group in such proportion as they occur in gadolinite.

3. A glower for electric lamps composed approximately of eighty parts of the oxid of zirconium and twenty parts of a mixture of gadolinite and the rare earths commonly associated therewith in nature, after removing a portion of those belonging to the cerium group.

Signed by me at Berlin this 10th day of August, 1899.

WALTHER NERNST.

Witnesses:
HENRY NOEL POTTER,
WOLDEMAR HAUPT.